Jan. 24, 1933.  R. STORK  1,895,214
TRANSPLANTER
Filed Aug. 12, 1932
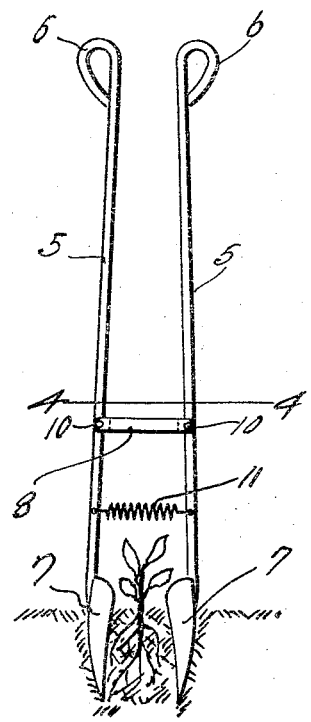
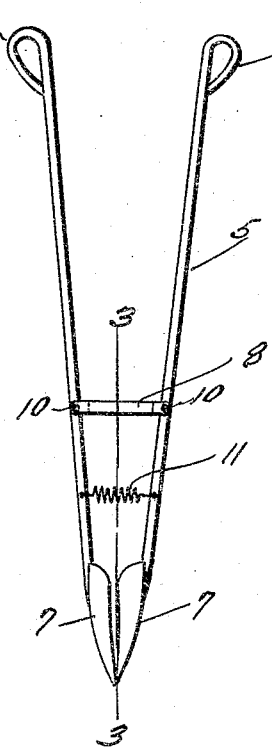
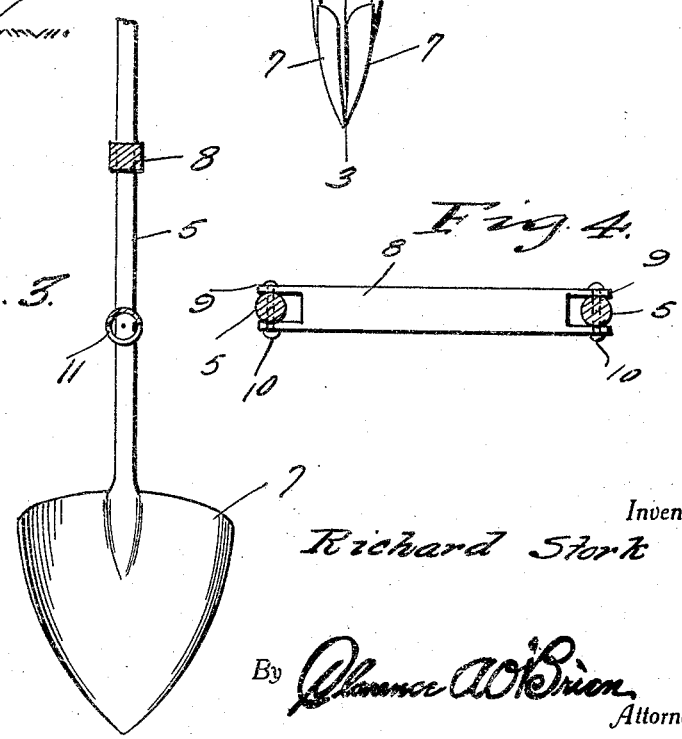
Inventor
Richard Stork
By Clarence A. O'Brien
Attorney Patented Jan. 24, 1933

1,895,214

UNITED STATES PATENT OFFICE

RICHARD STORK, OF GREENWICH, CONNECTICUT

TRANSPLANTER

Application filed August 12, 1932. Serial No. 628,600.

The present invention relates to a tool for transplanting flowers from one flower bed to another, especially for tender plants which are very hard to transplant as poppies, petunia, etc., or plants which are too far advanced in flowering that would be severely stunted or killed by the use of the common garden trowel or shovel.

The object of the invention resides in the provision of a transplanting tool of this nature which is exceedingly simple in its construction, inexpensive to manufacture, easy and convenient to operate and manipulate, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawing:

Figure 1 is a side elevation of the transplanter showing the same open.

Figure 2 is a similar view showing the same closed.

Figure 3 is a section taken substantially on the line 3—3 of Figure 2.

Figure 4 is a sectional view taken on the line 4—4 of Figure 1.

Referring to the drawing in detail it will be seen that numerals 5 denote two elongated shanks the upper ends of which are looped as at 6 to form handles and the lower ends of which are formed integrally or suitably attached to shovels 7. Numeral 8 denotes a bar having bifurcated ends 9 in which intermediate portions of the shank 5 are rockable by pins 10 or the like. A spring 11 is attached to intermediate portions of the shanks 5 between the shovels 7 thereof and the bar 8 to urge the shovels normally in abutment with each other as shown in Figure 2.

In Figure 1 I have shown the tool in the position in which it is inserted in the ground so as to position a shovel on opposite sides of the plant to be transplanted and a spring will urge these shovels toward each other so that the plant will be lifted out of the ground with a certain amount of soil for transplanting purposes.

It is thought that the construction, operation, utility and advantages of this invention will now be quite apparent to those skilled in this art without a more detailed description thereof.

It is apparent that changes in the details of construction may be resorted to without departing from the spirit or scope of the invention as hereinafter claimed.

Having thus described my invention, what I claim as new is:

A transplanter of the class described comprising a pair of elongated shanks, shovel elements on adjacent ends of the shanks handles on the other ends of the shank, a cross bar, means pivoting intermediate portions of the shank to the ends of the cross bar, a spring engaged with the shank below the cross bar to hold the shovels normally in abutment.

In testimony whereof I affix my signature.

RICHARD STORK.